United States Patent
Rydström et al.

(10) Patent No.: US 8,908,817 B1
(45) Date of Patent: Dec. 9, 2014

(54) DIFFERENTIAL PHASE TRACKING IN THE PRESENCE OF UNKNOWN INTERFERENCE

(75) Inventors: Mats Rydström, Billdal (SE); Dan Weinholt, Västra Frölunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/344,620

(22) PCT Filed: Sep. 28, 2011

(86) PCT No.: PCT/EP2011/066876
§ 371 (c)(1),
(2), (4) Date: Mar. 13, 2014

(87) PCT Pub. No.: WO2013/044951
PCT Pub. Date: Apr. 4, 2013

(51) Int. Cl.
*H04B 7/10* (2006.01)
*H04B 7/08* (2006.01)

(52) U.S. Cl.
CPC .................................... *H04B 7/084* (2013.01)
USPC ............ 375/347; 375/144; 375/148; 375/150; 375/346; 375/349; 375/326; 375/343; 375/350; 455/500; 455/501; 455/63.1; 455/132; 455/146; 455/209; 455/225; 455/296; 455/303; 455/314; 455/315; 455/335; 455/340

(58) Field of Classification Search
USPC ......... 375/144, 148, 150, 347, 346, 349, 326, 375/343, 350; 455/500, 501, 63.1, 132, 455/146, 209, 225, 296, 303, 314, 315, 335, 455/340
See application file for complete search history.

(56) References Cited

U.S. PATENT DOCUMENTS

| | | | | |
|---|---|---|---|---|
| 5,697,084 | A * | 12/1997 | Tingley | ....................... 455/276.1 |
| 6,285,663 | B1 | 9/2001 | Esmailzadeh | |
| 7,551,678 | B2 | 6/2009 | Kiyanagii et al. | |
| 7,573,398 | B2 * | 8/2009 | Hoctor et al. | ............ 340/870.12 |

FOREIGN PATENT DOCUMENTS

| | | |
|---|---|---|
| EP | 1788714 A2 | 5/2007 |
| WO | 9962205 A1 | 12/1999 |
| WO | 2006037241 A1 | 4/2006 |
| WO | 2012048723 A1 | 10/2010 |

* cited by examiner

*Primary Examiner* — Rahel Guarino
(74) *Attorney, Agent, or Firm* — Coats & Bennett, PLLC

(57) ABSTRACT

Example embodiments comprise a diversity receiver, and corresponding method, for measuring a differential phase between a first local oscillator of a first antenna and a second local oscillator of a second antenna in the presence of a primary interference signal and at least one secondary interference signal. The method may comprise receiving a primary communication signal, a primary reference signal and additional reference signals, and processing these signals such that a summation signal does not substantially comprise the at least one secondary interference signal. The estimation of differential phase is achieved by a phase shift calculation between processed signal components, using that a summation of all signal components equals, or is approximately equal to, a predetermined signal.

14 Claims, 11 Drawing Sheets

DIFFERENTIAL PHASE TRACKING IN THE PRESENCE OF UNKNOWN INTERFERENCE

TECHNICAL FIELD

Some example embodiments presented herein are directed towards a method in a receiver for interference suppression of wireless communication signals.

BACKGROUND

In multi-antenna systems, for example cross-polar interference cancellation (XPIC) systems and multiple-input multiple-output (MIMO) systems, the receiver typically needs accurate knowledge of the aggregate propagation channel between the transmitter and receiver in order to be able to decode transmitted data without an excessive amount of errors. In systems where radio frequency (RF) signals received by different antennas are down-converted using independent oscillators, the phase noise from the various oscillators distorts the received signals. In an attempt to reduce oscillator phase noise, present systems rely on local oscillators with low phase noise. Other systems rely on the use of a common down-converting oscillator for multiple receivers or complex signal processing techniques.

SUMMARY

Various problems exist with the present phase noise reduction solutions. An example of such a problem is that local oscillators with low phase noise are typically very expensive and have high power consumption and may thus greatly increase the cost of service. Another example is common oscillators with output that must be available in both receivers; therefore mechanical constraints are placed on the design of the receivers which may increase the cost of service. Signal processing techniques are also used in order to estimate a differential phase difference, which may be caused by phase noise between oscillators. Examples of such signal processing techniques are correlation and joint detection based approaches. Such signal processing techniques may place constraints on receiver systems, for example by limiting the bandwidth of the phase tracking system, and by significantly increasing overall system complexity.

Thus, at least one object of the example embodiments presented herein may be to provide an efficient multi-antenna system. Therefore, some example embodiments may be directed towards a method in a transmitter for interference suppression of wireless communication signals.

Some example embodiments may be directed towards a method in a receiver for measuring a differential phase between a first local oscillator of a first antenna and a second local oscillator of a second antenna in the presence of a primary interference signal and at least one secondary interference signal. The method may comprise receiving a primary communication signal, the primary communication signal being down-converted by the first local oscillator and filtered by a first adaptive filter. The method may also comprise receiving a primary reference signal, the primary reference signal being down-converted by the second local oscillator and filtered by a second adaptive filter. The method may also comprise receiving an additional reference signal, the additional reference signal being down-converted by an additional local oscillator and filtered by an additional adaptive filter.

The method may comprise processing the filtered additional reference signal, the filtered primary communication signal and the filtered primary reference signal, resulting in a first intermediate signal and a second intermediate signal such that a summation of the first intermediate signal and the second intermediate signal will not comprise, or will not substantially comprise, the at least one interference signal when the first local oscillator and the second local oscillator are phase aligned;

The method may also comprise estimating the differential phase between the first local oscillator and the second local oscillator when a predetermined signal is available by calculating the differential phase so that a summation of the first intermediate signal and the second intermediate signal with a relative phase shift of the differential phase equals, or is approximately equal to, the predetermined signal.

Some example embodiments may be directed towards a diversity receiver for measuring a differential phase between a first local oscillator of a first antenna and a second local oscillator of a second antenna in the presence of a primary interference signal and at least one secondary interference signal. The receiver may comprise a first receiver port to receive a primary communication signal, where the primary communication signal is down-converted by a first local oscillator and filtered by a first adaptive filter. The receiver may also comprise a second receiver port to receive a primary reference signal, where the primary reference signal is down-converted by a second local oscillator and filtered by a second adaptive filter. The receiver may further comprise a third receiver port to receive an additional reference signal, the additional reference signal being down-converted by an additional local oscillator and filtered by an additional adaptive filter. The receiver may also comprise a processing unit to process the filtered additional reference signal, the filtered primary communication signal and the filtered primary reference signal, resulting in a first intermediate signal and a second intermediate signal. The receiver may also comprise an estimation unit configured to estimate the differential phase between the first local oscillator and the second local oscillator by calculating a differential phase so that a summation of the first intermediate signal and the second intermediate signal with a relative phase shift of the differential phase equals, or is approximately equal to, a predetermined signal.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Figure 1:
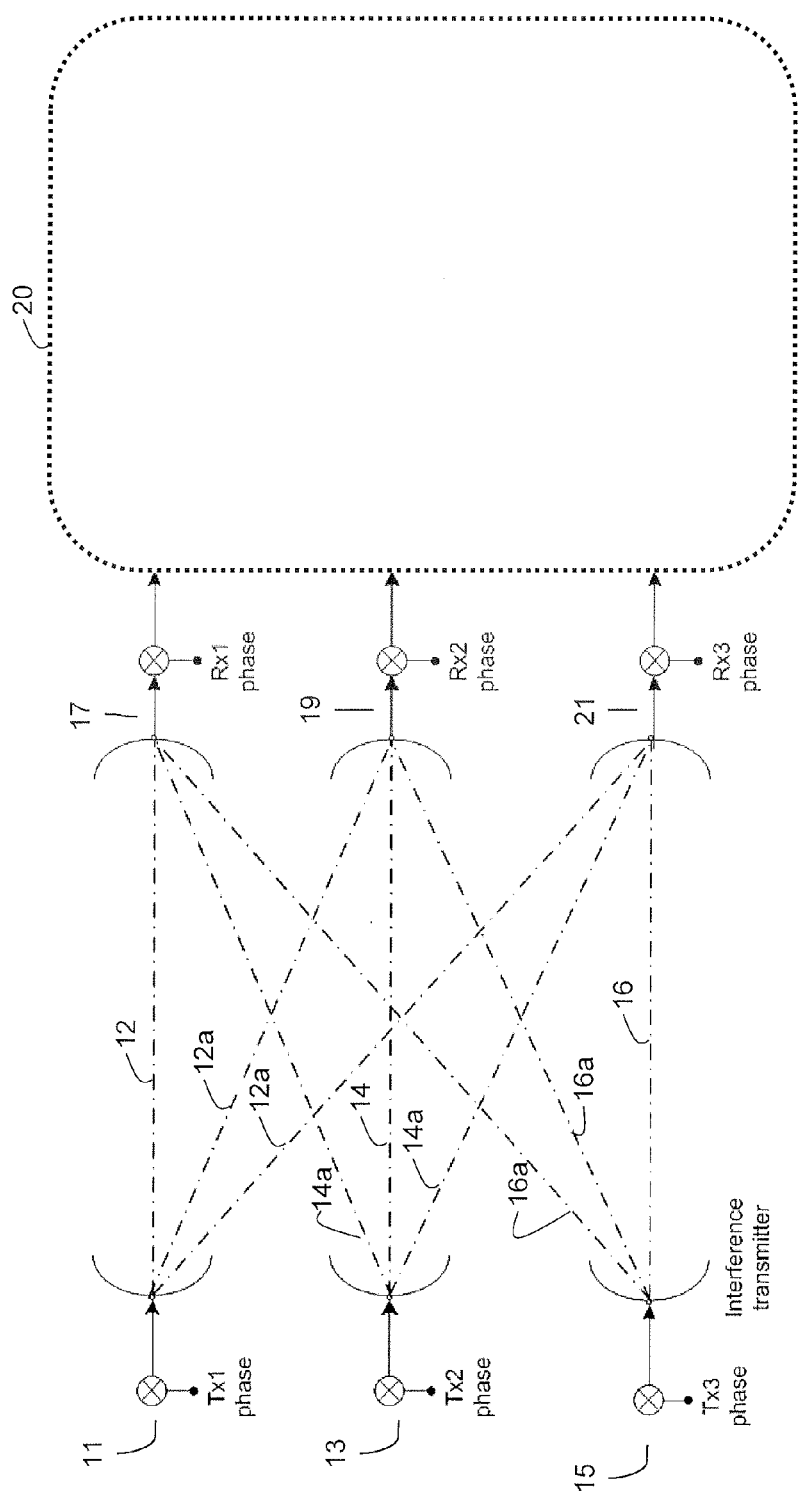
FIG. 1 is a schematic of a general MIMO system employing a cancelling technique to separate incoming signals.

FIG. 1 illustrates an example of a general multiple-input multiple-output (MIMO) system. The system of FIG. 1 may comprise any number of transmitters, for example TX1 11, TX2 13, and TX3 15. The transmitters 11, 13, and 15 may be configured to send wireless signals 12, 14, and 16, respectively, to a receiver 20. The receiver 20 may comprise receiver ports 17, 19, and 21 which may be configured to receive the wireless signals 12, 14, and 16, respectively. It should be appreciated that in addition to the transmitted signals 12, 14, and 16, the receiver ports 17, 19, and 21 may also receive interference in the form of cross signals 12a, 14a and 16a.

Figure 2:
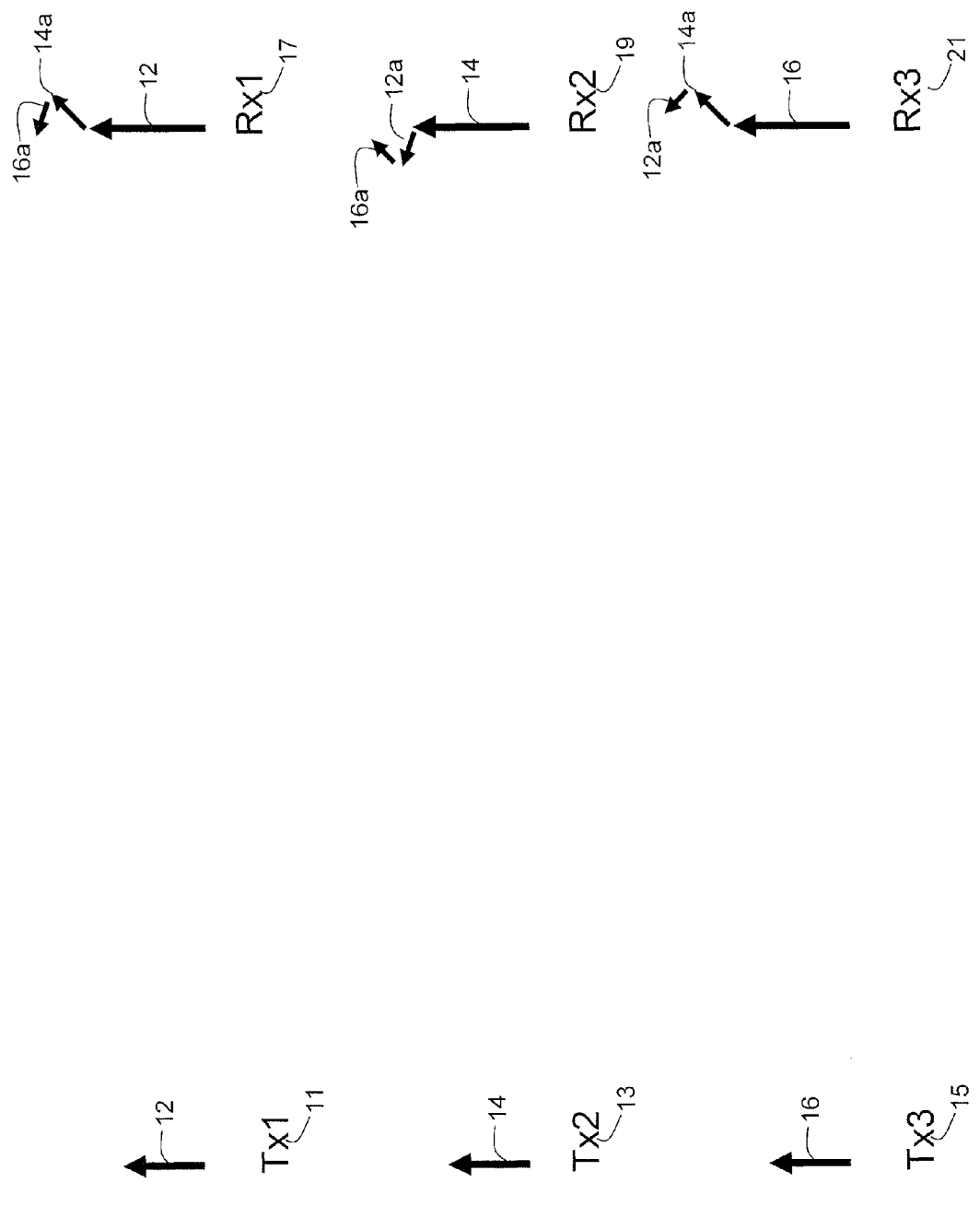
FIG. 2 is an illustrative example of signals which may be received by the system of FIG. 1.

FIG. 2 illustrates a phase and amplitude representation of the transmitted and received signals of FIG. 1. As shown on the left-hand side of FIG. 2, transmitters 11, 13, and 15 may transmit signals 12, 14, and 16, respectively. Corresponding receiver ports 17, 19, and 21 may be configured to receive the transmitted signals 12, 14, and 16, respectively. Due to cross-talk, receiver port 19 may also receive interference signals 14a, originating from transmitter 13, and 16a originating from transmitter 15. Similarly, receiver port 19 may receive interference signals 12a, originating from transmitter 11, and 16a originating from transmitter 15. Receiver port 21 may receive interference signals 12a, originating from transmitter 11, and 14a originating from transmitter 13. The interference signals 12a, 14a, and 16a may be out of phase and comprise different amplitudes with respect to the received signals 12, 14, and 16, respectively. As illustrated in the figures, each received signal may comprise large amounts of interference which will need to be cancelled or suppressed in order to avoid excessive detection errors. It should be noted that the interference received at each receiver port may be from an unknown origin and of unknown characteristics, thus making interference cancellation challenging.

The receiver system 20 of FIG. 1 comprises various hardware components, which are not illustrated, configured to remove the interference components 12a, 14a, and 16a of the received signals. The receiver system 20 may also utilize signal processing techniques to estimate a differential phase between the different oscillators of the receiver system 20. Knowledge of the differential phase may be useful in suppressing the interference in the received signals.

Standard signal processing techniques for differential phase estimation include correlation and joint detection based approaches. In correlation based approaches a reference signal received by a given reference antenna (e.g., 'Rx2' in the example of FIG. 2) is correlated with the detection error using an adaptive filter (e.g. a Least Mean Squares (LMS) algorithm) in order to find the angle between the detection error (assumed to originate at least in part from the interfering signal received at the reference antenna) and the reference signal. An adaptive filter in the receiver system 20, in addition to phase rotation, may also handle other channel effects such as frequency selective fading.

Correlator based approaches do not require full knowledge of all transmitted signal characteristics, and can therefore be used even if the interfering signal is unknown. However, in order to average out (or suppress) strong noise and interference the bandwidth of the control loop must be reduced. The bandwidth of the phase tracker is thus often too low to be able to handle the severe phase noise experienced in, e.g., microwave systems (with carrier frequencies on the order of tens of Gigahertz and non-ideal oscillators).

If all transmitted signals have known characteristics such as rate, modulation, timing, etc., then all signals can be jointly detected and an error vector can be used to estimate the channel transfer function, including differential receiver phase. In such systems so-called joint pilot symbols are often transmitted simultaneously from all antennas in order to improve performance and robustness of the system.

Joint detection approaches (pilot-based or non pilot-based) often show good performance when it comes to phase tracking in severe phase noise conditions where all transmitted signals in the band have known characteristics (such as rate, modulation etc.). The drawback, apart from high complexity, is that when interference signals with unknown characteristics (such as symbol-rate and modulation) are present, then this interference must be averaged out in a style similar to the correlation-based approach described above. This implies a reduced phase tracking system bandwidth and therefore also a degraded phase noise robustness.

Figure 3:
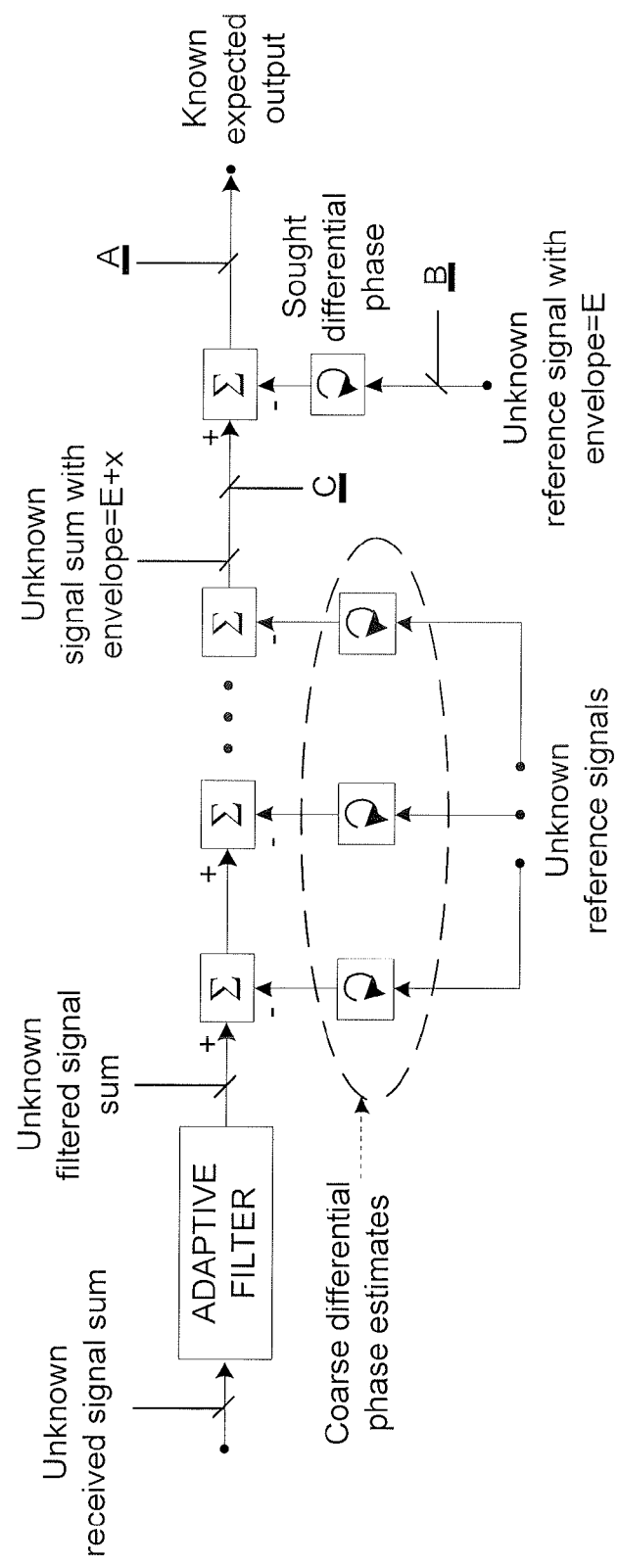
FIG. 3 is an illustration of a receiver system, according to some of the example embodiments.
Figure 4:
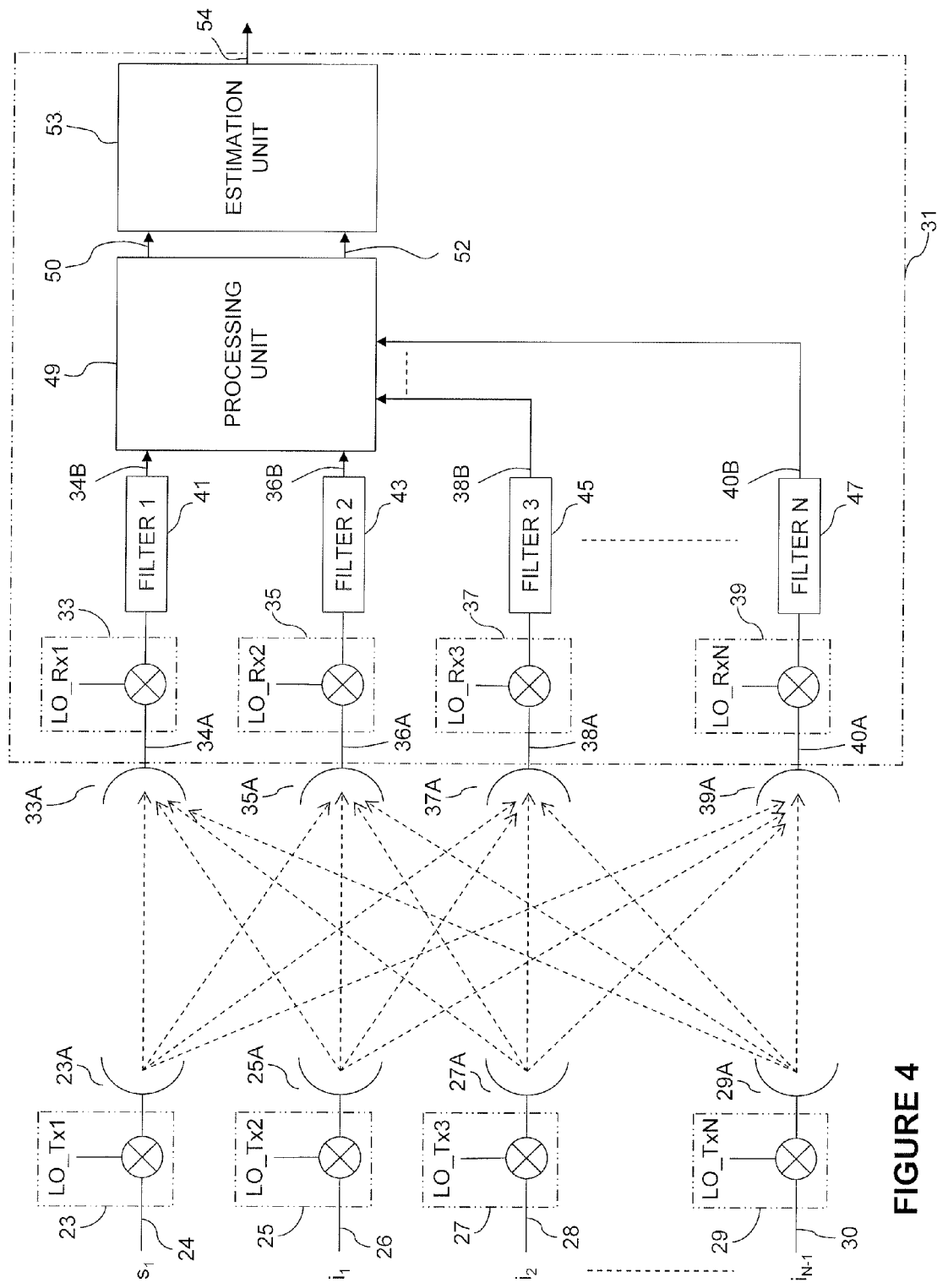
FIGS. 4-9 and 11 are schematics of MIMO systems, according to some of the example embodiments.
Figure 5:
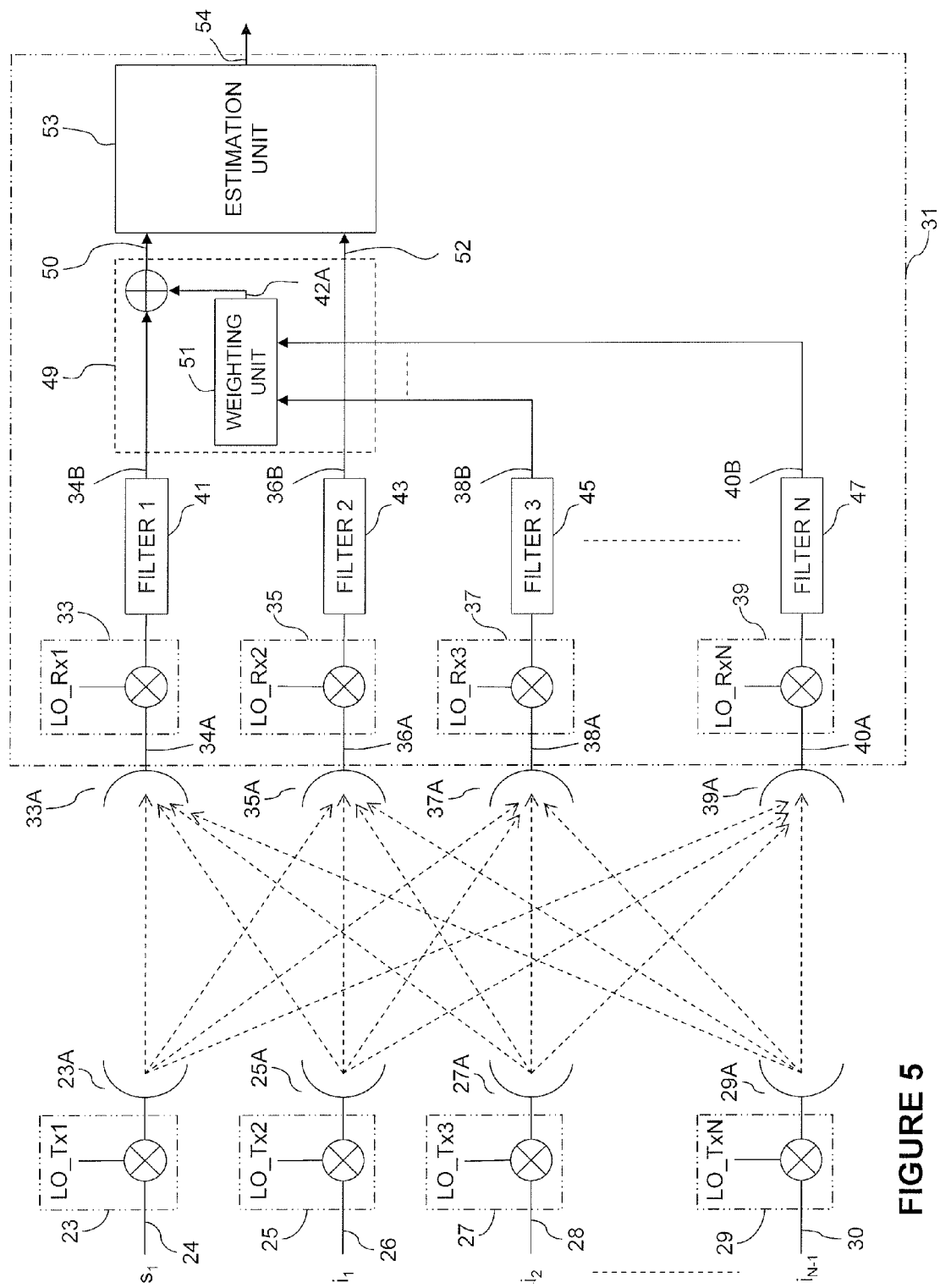
Figure 6:
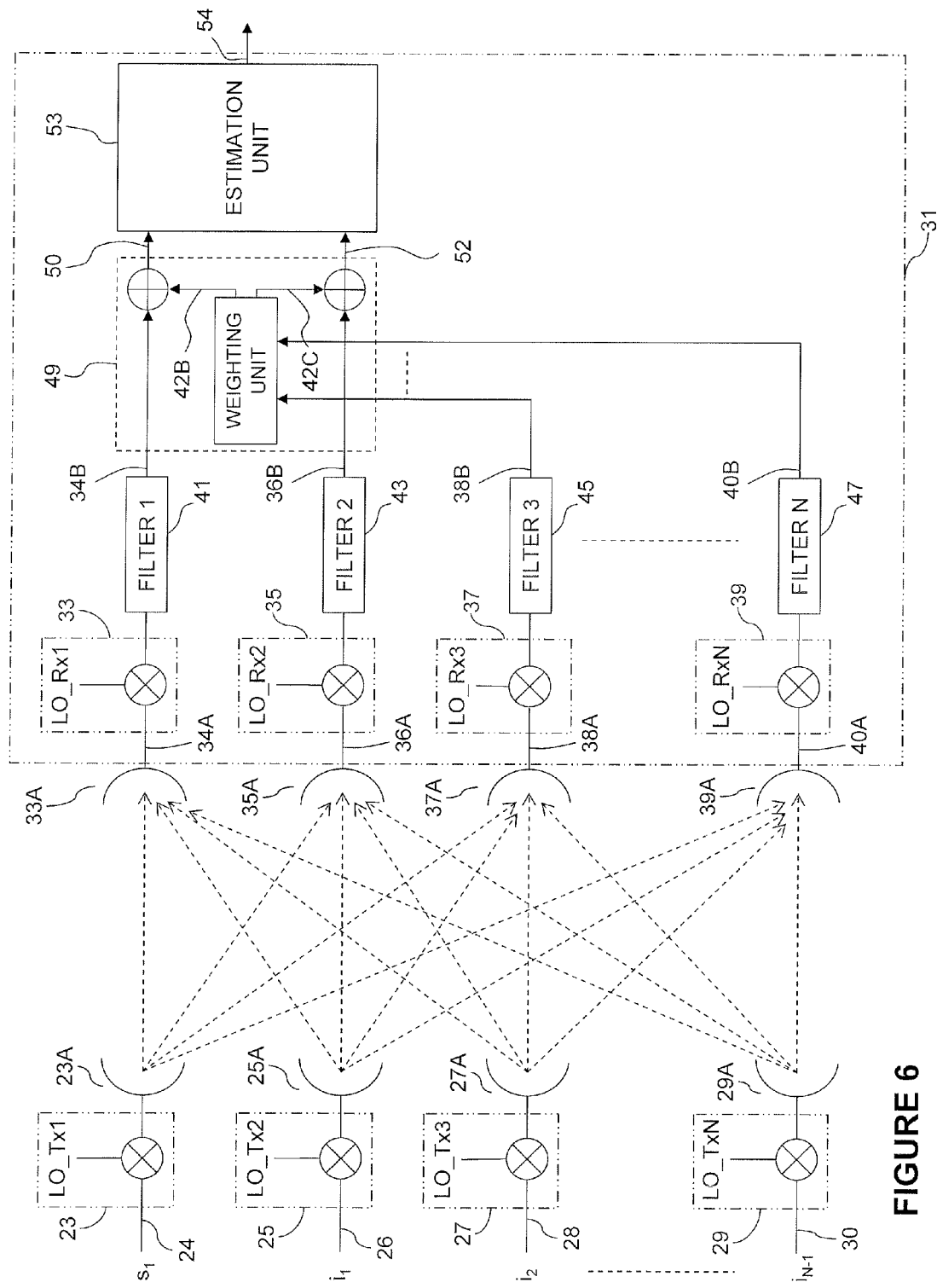
Figure 7:
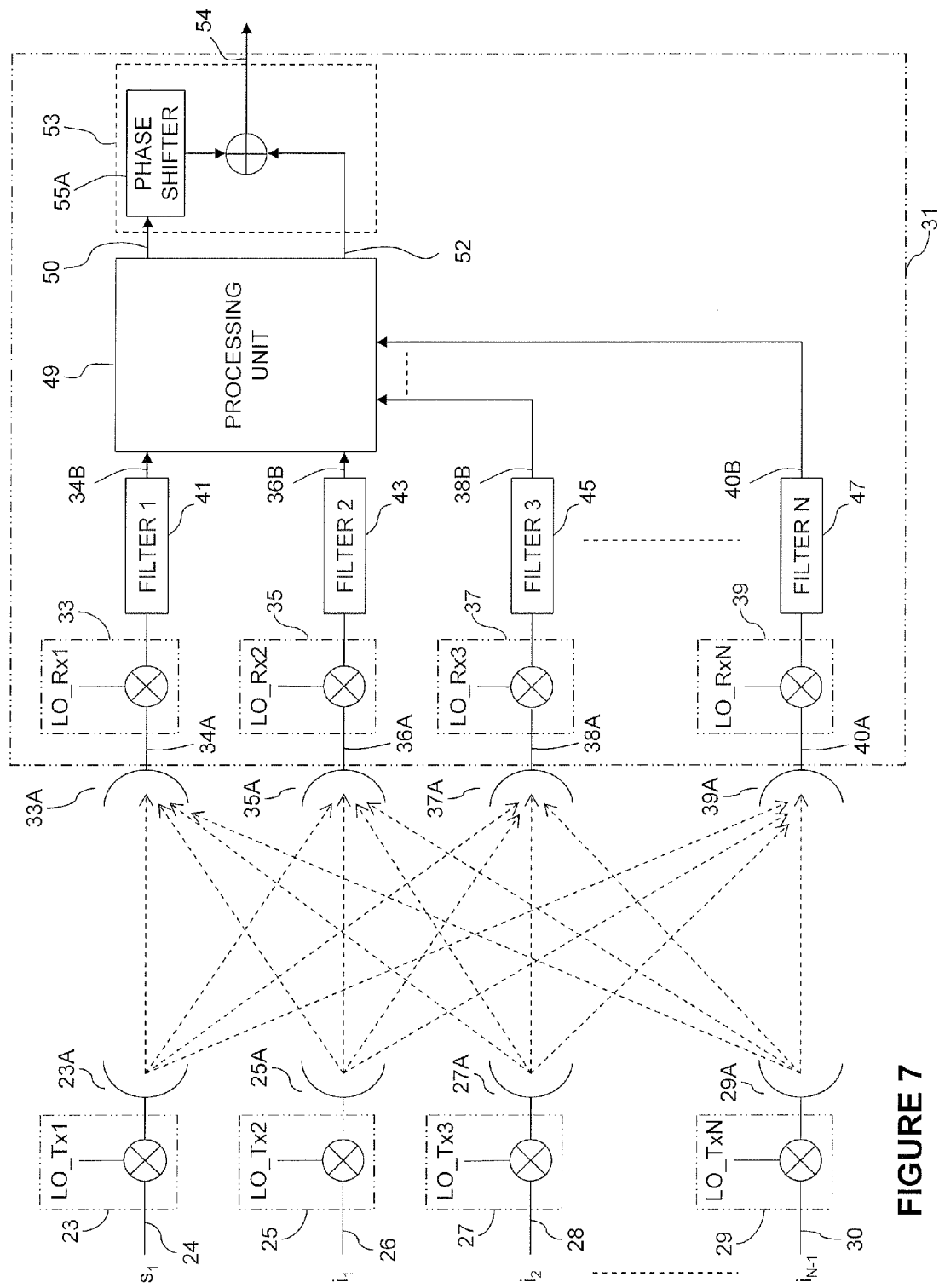
Figure 8:
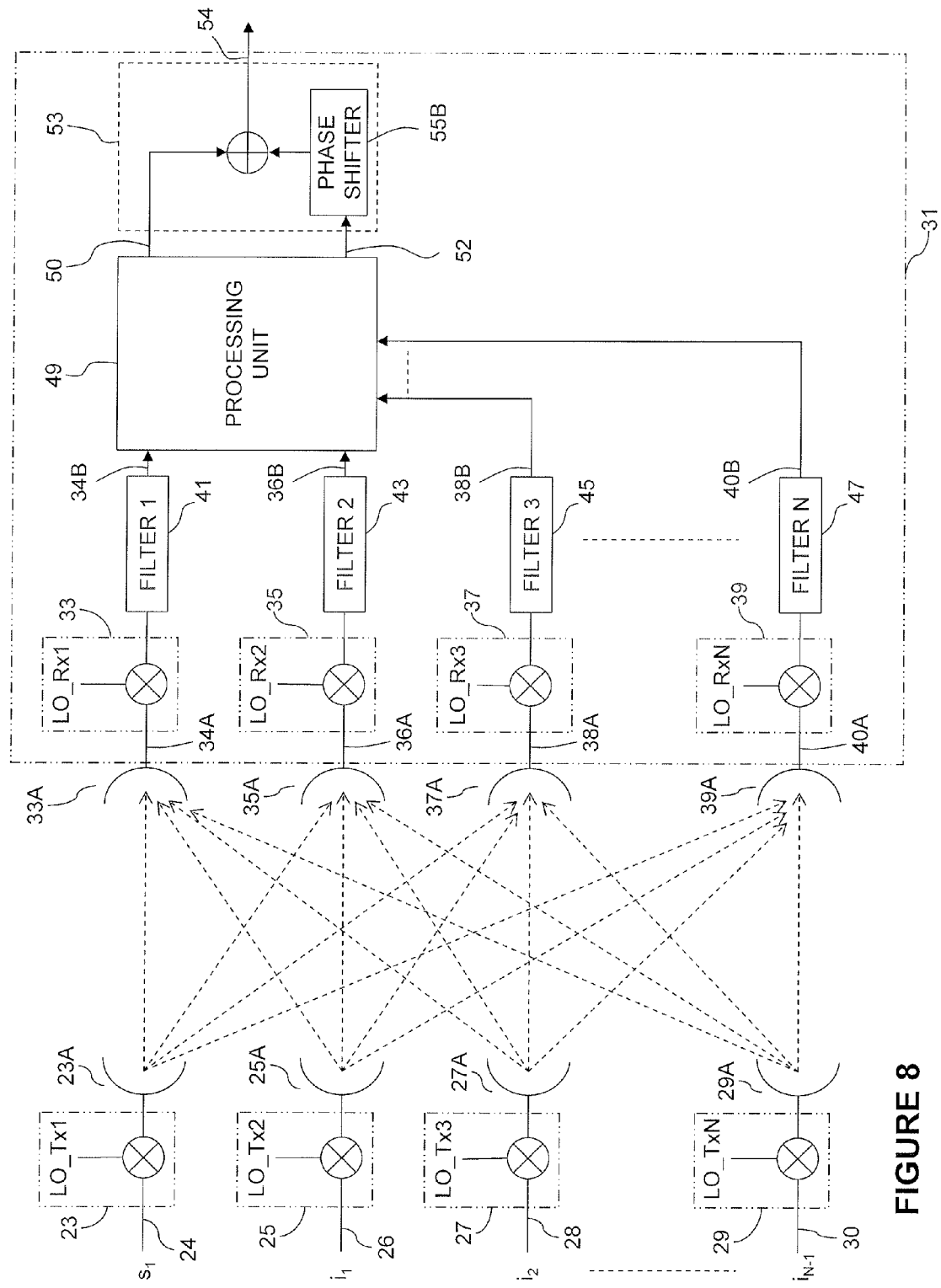
Figure 9:
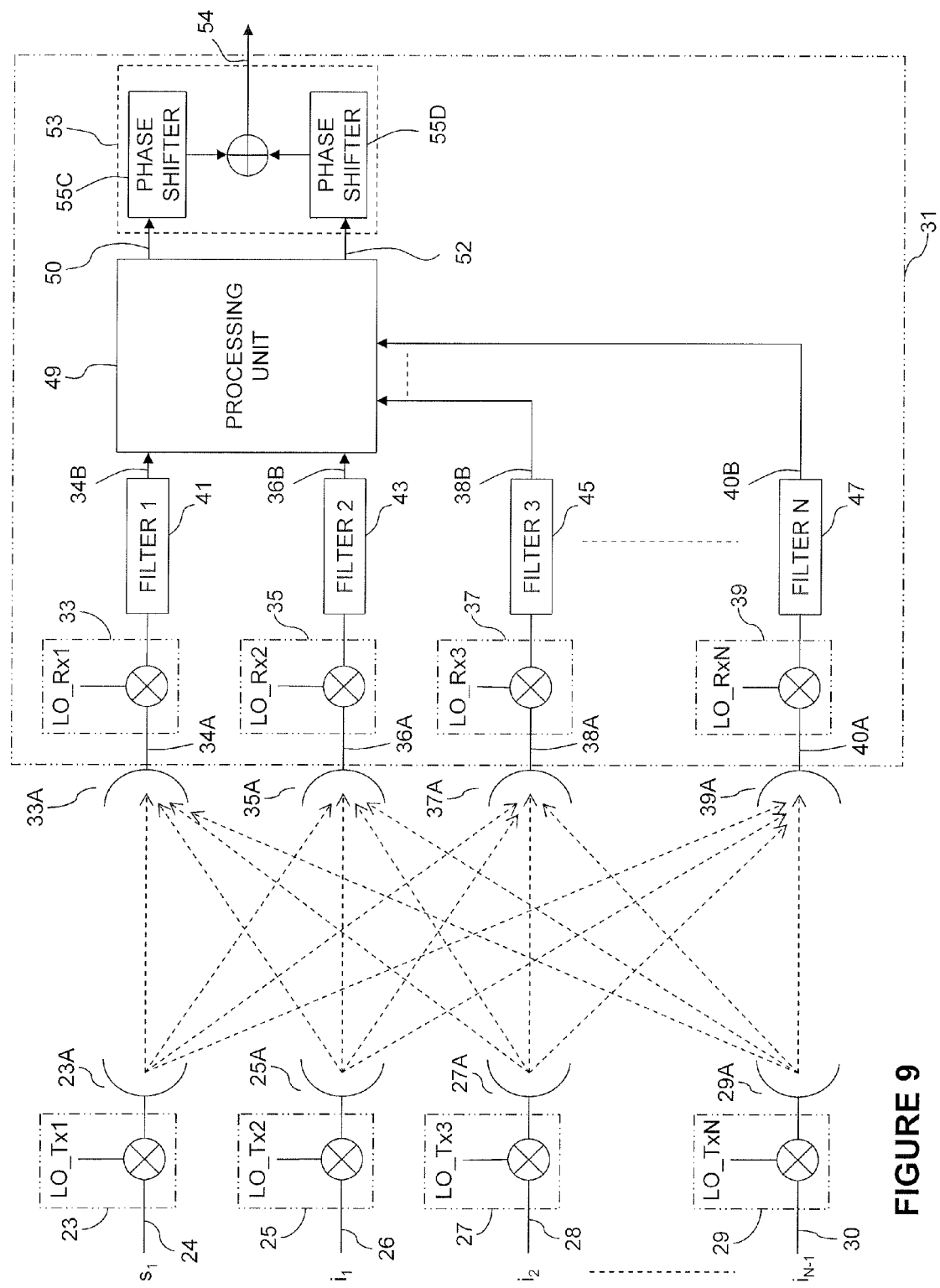

The example embodiments presented herein utilize the fact that the changes in the linear distortion handled by adaptive filters are slower than changes in phase due to phase noise (and handled by differential phase trackers such as correlation and joint detection based methods). Hence, as illustrated in FIG. 3, when a final expected output after summation of all filtered and processed branch signals in a multi-antenna system (point A in FIG. 3) is known or can be estimated, it is possible to remove one reference signal, assuming that the output of that branch is correct in envelope but has unknown phase (point B in FIG. 3), and then measure the phase difference between the unknown signal in the removed branch and the unknown signal sum obtained after adding together the signals in the remaining branches (point C in FIG. 3).

Some of the example embodiments presented herein utilize the assumption that changes in channel propagation conditions are slow compared to the variations in transmitter and receiver phases. If this is the case, then the output of different receiver ports or antennas can be filtered with low bandwidth filters and the outputs may still have the appropriate amplitude. Then, if the system is in steady state operation where all 'slow' adaptive filters have converged, it is possible to directly measure the relative receiver branch phase difference between two branches or ports as long as the expected output after summing all branch contributions is approximately known and/or coarse estimates of differential phase is available for the remaining branches.

As an example, suppose a signal $Rx_1$ is received at a given antenna, this signal may be affected by strong interference from a number of different interferers with unknown modulation format, as explained in relation to FIGS. 1 and 2. The receiver may have access to a number of reference signals $Rx_2$ to $Rx_N$, whose output signals are in some way correlated with the interference in signal $Rx_1$. Now, if the receiver has access to coarse differential phase estimates $\phi_2$ to $\phi_{N-1}$ between the receiver antenna or port one (RX1) and the reference antennas or ports (e.g., RX2-RXN), and if the receiver knows the approximate expected output after summing all branch contributions $Rx_1$ to $Rx_N$, i.e., $$Rx_1 + Rx_2 e^{j\phi_2} + Rx_3 e^{j\phi_3} + \ldots + Rx_N e^{j\phi_N} \approx s \qquad (4)$$

Then, an estimate of the differential phase between the main receiver branch and the $N^{th}$ branch can be obtained as:

$$\hat{\phi}_N = \arg(Rx_1 + Rx_2 e^{j\phi_2} + Rx_3 e^{j\phi_3} + \ldots + Rx_{N-1} e^{j\phi_{N-1}} - s) - \arg(Rx_N). \qquad (5)$$

If the filters are assumed to be correctly converged or almost correctly converged, the following equation may be provided:

$$\text{abs}(Rx_1 + Rx_2 e^{j\phi_2} + Rx_3 e^{j\phi_3} + \ldots + Rx_{N-1} e^{j\phi_{N-1}} - s) \approx \text{abs}(Rx_N). \quad (6)$$

This estimation of relative phase between two branches does not explicitly assume any estimate of individual transmitter oscillator phases, channel phases, or receiver oscillator phases (as is typically required), nor does it assume any knowledge of the interference signals (e.g. modulation, timing, rate, etc.). The amount of interference that can be handled with acceptable degradation to the phase estimate depends on the quality in a priori available information about relative phases and amplitudes of the remaining branches or receiver ports. Even with relatively low quality a priori information; the example embodiments may significantly improve the performance of differential phase trackers.

Assuming that known symbols, i.e., a symbol whose value is a-priori known by the receiver, are transmitted regularly; some of the example embodiments may be utilized to estimate the differential phase by first back-rotating the known symbol corresponding to the carrier recovery current angle and subtracting this known and back-rotated symbol from the main branch. An estimate of relative phase between the first and second branch may be obtained as:

$$\hat{\phi}_{1-2} = \arg(r_1 + r_3 e^{j\phi_{1-3}} - s e^{-j\phi_{1-1}}) - \arg(r_2) \quad (7)$$

$\phi_{1-2}$—Tx1–Rx2 phase difference (unknown)
$\phi_{1-1}$—Existing estimate of Tx1–Rx1 phase difference
$\phi_{1-3}$—Existing estimate of Rx1–Rx3 phase difference
s—known transmitted symbol In the above example, the coarse estimate of differential phase between first and third receive branch may be obtained by straightforward correlation, as discussed above. However, it should be noted that this coarse estimate may be obtained in any number of different ways known in the art. Also, the differential phase between transmitter and first receive chain may be obtained from a carrier recovery block. Carrier recovery may be implemented using any known method of the art.

A special case is when the transmitted known data comprises symbols located at the center of the constellation diagram. In this case 's' in the above equation is zero (at the sampling instance) and thus the expression above becomes independent of transmitter phase, i.e.:

$$\hat{\phi}_{1-2} = \arg(r_1 r_3 e^{j\phi_{1-3}}) - \arg(r_2) \quad (8)$$

If no known symbols are transmitted in the system, then the example embodiments may still be applicable. In practice the example embodiments may still be applicable as long as detection error probability is sufficiently low (at least for a sub-set of symbols). One example of this scenario is if symbols drawn from a low order constellation (e.g., 4-QAM) are embedded into a symbol stream modulated with a high order constellation (e.g., 128-QAM or above). Here, a preliminary detection may be made using preliminary estimates of differential phase. Such preliminary estimates can be obtained, for example, by extrapolating the previous estimates of differential phase using knowledge of the frequency offset between branches or receiver ports, or by employing the correlator-based approach briefly described above. All received signals may then be delayed by an amount corresponding to the delay incurred by preliminary detection. After this delay the detected symbol can be assumed to be known and thus back-rotated and used as in the case of known transmitted data.

FIGS. 4-9 are illustrative examples of a communications system according to some of the example embodiments. FIG. 4-9 illustrate a number of transmitters which may be configured to transmit any type of communication signal. In the examples provided by FIGS. 4-9, transmitter 23A may be configured to transmit a primary communication signal 24, transmitter 25A may be configured to transmit a primary interference signal 26, and transmitters 27A and 29A may be configured to transmit secondary interference signals 28 and 30.

The transmitted signals may be received by a receiver system 31. The receiver system 31 may comprise any number of receiver ports, where each receiver port may be associated with a local oscillator. In the example provided by the figures, receiver port 33A may be configured to receive the transmitted primary communication signal 34A. Receiver port 35A may be configured to receive a primary reference signal 36A. Receiver ports 37A and 39A may be configured to receive additional reference signals 38A and 40A. It should be appreciated that the received reference signals 36A, 38A, and 40A may come from an unknown origin and may comprise unknown signal characteristics.

Each receiver port may also be associated with an adaptive filter. For example receiver ports 33A, 35A, 37A, and 39A may be associated with adaptive filters 41, 43, 45, and 47, respectively. The receiver system 31 may also comprise any number of processing units 49 and estimation units 53. The processing 49 and estimation 53 unit may be any suitable type of computation unit, e.g. a microprocessor, digital signal processor (DSP), field programmable gate array (FPGA), or application specific integrated circuit (ASIC). It should also be appreciated that the processing 49 and estimation 53 units need not be comprised as separate units. The processing 49 and estimation 53 units may be comprised as a single unit or any number of units.

Figure 10:
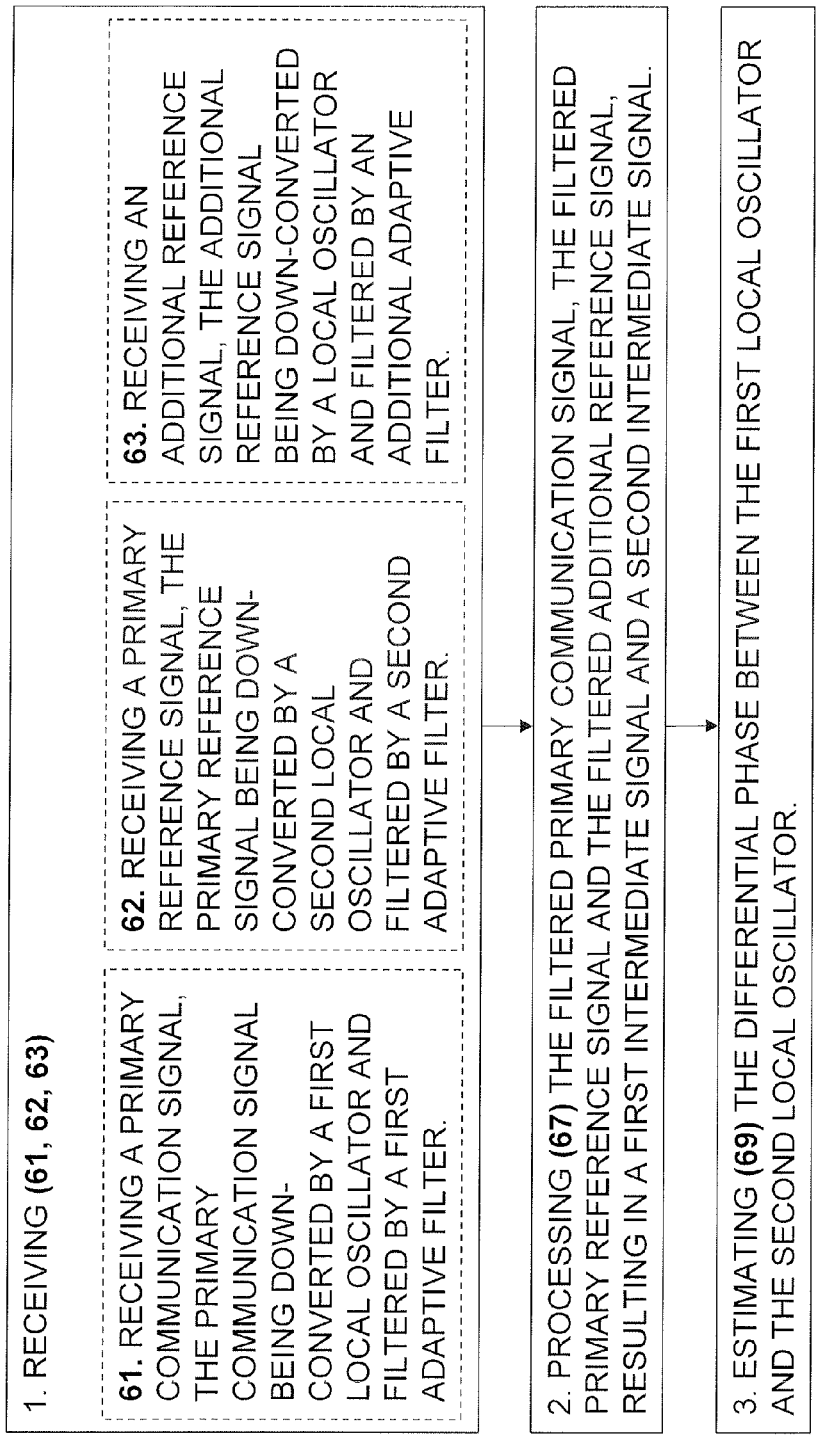
FIG. 10 is a flow diagram depicting example operations which may be performed by the systems of FIGS. 4-9 and 11.

FIG. 10 is a flow diagram depicting example operational steps which may be taken by the receiver system 31 of FIGS. 4-9.

Example Operation 61

The example operations may comprise the first receiver port 33A of the receiver system 31 being configured to receive 61 the primary communication signal 34, the primary communication signal 34 being down-converted by the first local oscillator and filtered by the first adaptive filter 41, resulting in a filtered primary communication signal 34B.

Example Operation 62

The example operations may also comprise the second receiver port 35A of the receiver system 31 being configured to receive a primary reference signal 36, the primary reference signal 36 being down-converted by the second local oscillator and filtered by the second adaptive filter 43, resulting in a filtered primary reference signal 36B.

Example Operation 63

The example operations may also comprise an additional receiver port (e.g., receiver port 37A and/or 39A) of the receiver system 31 being configured to receive an additional reference signal (e.g., additional reference signal 38 and/or 40), the additional reference signal being down-converted by an additional local oscillator and filtered by an additional adaptive filter (e.g., adaptive filters 45 and/or 47), resulting in a filtered additional reference signal 38B and/or 40B.

It should be appreciated that the filters of example operations 61, 62, and 63 may be adjusted using a common error signal. It should further be appreciated that the primary reference signal and/or the additional reference signal may comprise unknown signal characteristics and/or may be from an unknown origin.

Example Operation 67

The example operations may also comprise the processing unit 49 of the receiver system 31 being configured to process the filtered primary communication signal 34B, the filtered primary reference signal 36B, and the filtered additional reference signal (e.g., additional reference signal 38B and/or 40B) resulting in a first intermediate summation signal 50 and a second intermediate summation signal 52.

Example Operation 69

The example operations may also comprise an estimation unit 53 of the receiver system 31 being configured to estimate 69 the differential phase between the first local oscillator and the second local oscillator when a predetermined signal is available by calculating the differential phase so that a summation of the first intermediate signal 50 and the second intermediate signal 52 with a relative phase shift of the differential phase equals, or is approximately equal to, the predetermined signal.

It should be appreciated, that when the summation of intermediate signals is approximately equal to a predetermined signal, it is implied that any interference in the system has been suppressed.

In some example embodiments the predetermined signal may be a zero signal. In some example embodiments the predetermined signal may be a QAM signal. In other example embodiments the predetermined signal may be a pilot signal. In other example embodiments the predetermined signal may be a previously received and detected signal.

Thus, as a result of the processing and estimation, the interference (from either known or unknown origins) may be suppressed. In some example embodiments the processing may further comprise multiplying the filtered additional reference signal with a complex-valued weight. The complex-valued weight may be determined so that the final summation signal and/or at least one intermediate summation signal does not comprise, or does not substantially comprise, the second interference signal. It should be appreciated that the complex valued weight may be used to implement a rotation of the filtered input signal.

Figure 11:
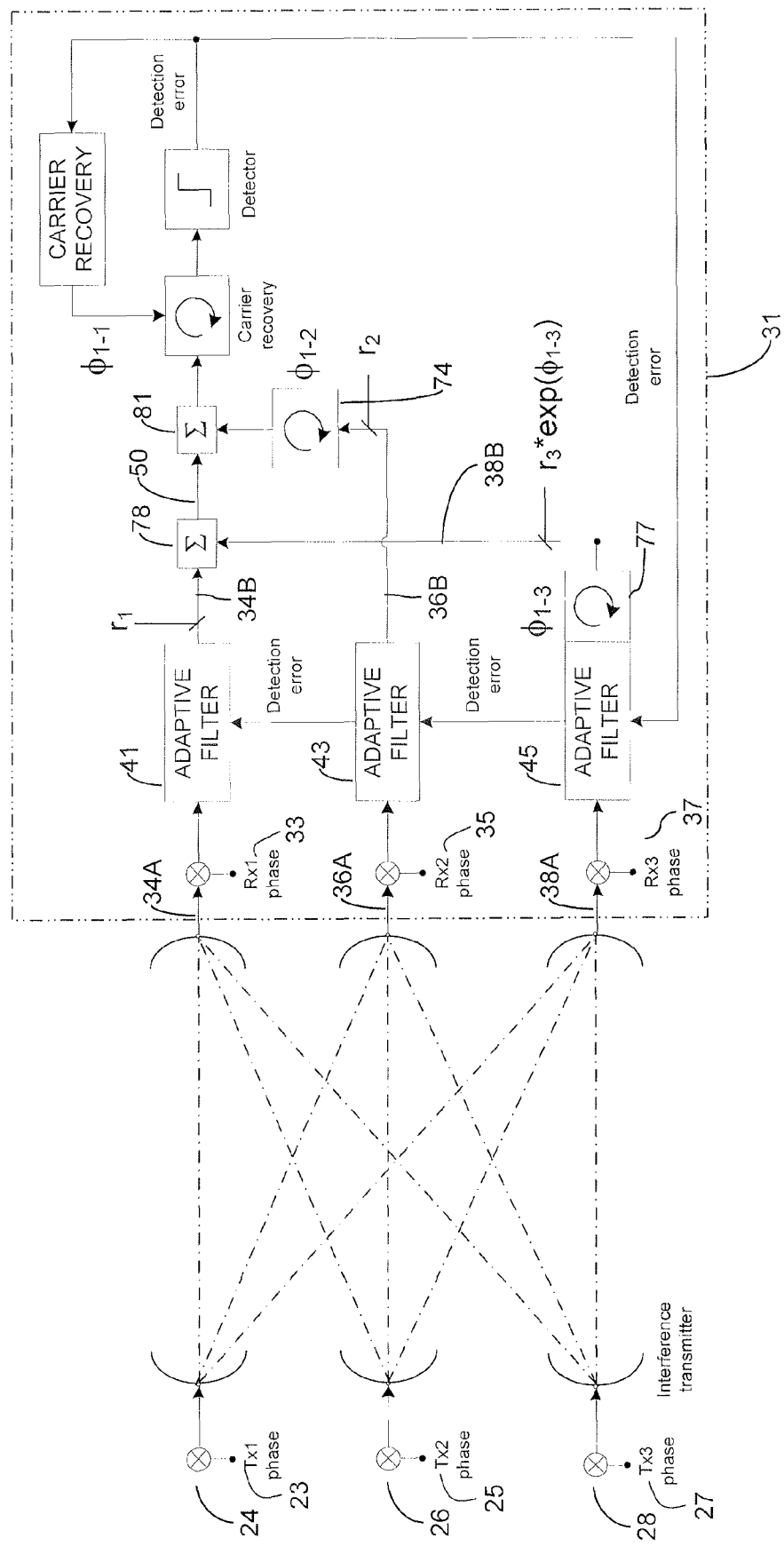

FIG. 11 provides a schematic example of a receiver system 31 which utilizes complex valued weights (i.e., signal rotations) in the suppression of interference signals, and also of the final summation signal before detection (carrier recovery). In the example provided by FIG. 11, the additional reference signal 38A is filtered by the adaptive filter 45 and multiplied by complex valued weight 77 which comprises a rotation. In determining an amount of rotation to be provided by the rotational element 77, a differential phase estimate between the first and third local oscillators may be utilized or other available a-priori information about differential phases in the system. This may be a coarse estimate, thus any method known in the art may be utilized.

Upon rotation, the additional filtered and rotated reference signal 38B may be processed or summed with the filtered primary communication signal 34B via a summing component 78. The summation may result in a first intermediate summation signal 50. The filtered primary reference signal 36B may also be rotated via a rotational element 74. In the rotation of the filtered primary reference signal 36B, a differential phase estimate between the local oscillator of the first receiver port 33A and the local oscillator of the second receiver port 35A may be obtained. This estimation may be obtained utilizing the example embodiments discussed above. It should be appreciated that in this example, the filtered primary reference signal 36B makes up the second intermediate summation signal. Thereafter, the rotated primary reference signal may be processed or summed with the first intermediate summation signal 50 via a summation element 81. The sum after summation 81 comprises the primary communication signal where interference is suppressed, however, its phase may not necessarily be correct. This phase is therefore corrected by a carrier recovery algorithm that can be implemented in a number of different ways known in the art.

It should be appreciated that once the differential phase estimate has been obtained at some given instants in time, according to the example embodiments, differential phase estimates for other instants in time may be obtained by interpolation. The example operation of interpolating may further comprise the receiver buffering any of the reference or communication signals and utilizing the buffered signal in the processing and estimation operations described above after a delayed period of time. By delaying the processing and estimation of a received reference signal, a future value of the differential phase estimation may be obtained. It should also be appreciated that phase shifting may be applied by the adaptive filters, the processing units, phase shifting elements, and/or any other system element. It should further be appreciated that the applied phase shift may be distributed among any number of, or combination of, signals in the system.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, in a diversity receiver, for calculating an estimate of a differential phase between a first local oscillator of a first antenna and a second local oscillator of a second antenna, in a presence of at least one interference signal, the method comprising:
    receiving a primary communication signal, the primary communication signal being down-converted by the first local oscillator, and filtered by a first adaptive filter, resulting in a filtered primary communication signal;
    receiving a primary reference signal, the primary reference signal being down-converted by the second local oscillator and filtered by a second adaptive filter, resulting in a filtered primary reference signal;
    receiving an additional reference signal, the additional reference signal being down-converted by an additional local oscillator, and filtered by an additional adaptive filter, resulting in a filtered additional reference signal;
    processing the filtered primary communication signal, the filtered primary reference signal, and the filtered additional reference signal, resulting in a first intermediate signal and a second intermediate signal such that a summation of the first intermediate signal and the second intermediate signal will not substantially comprise the at least one interference signal when the first local oscillator and the second local oscillator are phase aligned;
    estimating the differential phase between the first local oscillator and the second local oscillator by calculating the differential phase such that a summation of the first intermediate signal and the second intermediate signal, with a relative phase shift of the differential phase, is approximately equal to a predetermined symbol.

2. The method of claim 1, wherein the processing the filtered primary communication signal comprises:
    summing the filtered primary communication signal and a weighted additional reference signal obtained by weighting the filtered additional reference signal with a complex-valued weight, resulting in the first intermediate signal;
    forwarding the filtered primary reference signal;
    wherein the second intermediate signal is equal to the primary reference signal.

3. The method of claim 1, wherein the processing the filtered primary communication signal comprises:
    summing the filtered primary communication signal and a first weighted additional reference signal obtained by weighting the filtered additional reference signal with a first complex-valued weight, resulting in the first intermediate signal;
    summing the filtered primary reference signal and a second weighted additional reference signal obtained by weighting the additional reference signal with a second complex-valued weight, resulting in the second intermediate signal.

4. The method of claim 1, wherein the calculating the differential phase shift comprises phase shifting at least one of the first intermediate signal and the second intermediate signal.

5. The method of claim 1, wherein the predetermined symbol is a zero symbol.

6. The method of claim 1, wherein the predetermined symbol is a predetermined Quadrature Amplitude Modulation (QAM) symbol.

7. The method of claim 1, further comprising adjusting the first adaptive filter, the second adaptive filter, and the additional adaptive filter with a common error signal.

8. A diversity receiver in a communication system, the receiver configured to calculate an estimate of a differential phase between a first local oscillator of a first antenna and a second local oscillator of a second antenna, in a presence of at least one interference signal, the diversity receiver comprising:
    a first receiver port configured to receive a primary communication signal, the primary communication signal being down-converted by the first local oscillator and filtered by a first adaptive filter, resulting in a filtered primary communication signal;
    a second receiver port configured to receive a primary reference signal, the primary reference signal being down-converted by the second local oscillator and filtered by a second adaptive filter, resulting in a filtered primary reference signal;
    an additional receiver port configured to receive an additional reference signal, the additional reference signal being down-converted by an additional local oscillator and filtered by an additional adaptive filter, resulting in a filtered additional reference signal;
    a processing circuit configured to process the filtered primary communication signal, the filtered primary reference signal, and the filtered additional reference signal, resulting in a first intermediate signal and a second intermediate signal such that a summation of the first intermediate signal and the second intermediate signal will not substantially comprise the at least one interference signal when the first local oscillator and the second local oscillator are phase aligned;
    an estimation circuit configured to estimate the differential phase between the first local oscillator and the second local oscillator by calculating the differential phase such that a summation of the first intermediate signal and the second intermediate signal, with a relative phase shift of the differential phase, is approximately equal to a predetermined symbol.

9. The receiver of claim 8:
    wherein the processing circuit is further configured to:
        sum the filtered primary communication signal and a weighted additional reference signal obtained by weighting the filtered additional reference signal with a complex-valued weight, resulting in the first intermediate signal;
        forward the filtered primary reference signal;

wherein the second intermediate signal is equal to the primary reference signal.

10. The receiver of claim 8, wherein the processing circuit is further configured to:
sum the filtered primary communication signal and a first weighted additional reference signal obtained by weighting the filtered additional reference signal with a first complex-valued weight, resulting in the first intermediate signal;
sum the filtered primary reference signal and a second weighted additional reference signal obtained by weighting the additional reference signal with a second complex-valued weight, resulting in the second intermediate signal.

11. The receiver of claim 8, wherein the calculating the differential phase comprises phase shifting at least one of the first intermediate signal and the second intermediate signal.

12. The receiver of claim 8, wherein the predetermined symbol is a zero symbol.

13. The receiver of claim 8, wherein the predetermined symbol is a predetermined Quadrature Amplitude Modulation (QAM) symbol.

14. The receiver of claim 8, wherein the first adaptive filter, the second adaptive filter, and the additional adaptive filter are configured to be updated with a common error signal.

* * * * *